Patented Oct. 8, 1935

2,016,319

UNITED STATES PATENT OFFICE 2,016,319

PROCESS OF MAKING A DEHYDRATED FLOUR MIX

John D. Duff, Pittsburgh, and Louis E. Dietrich, Crafton, Pa., assignors to P. Duff & Sons, Inc., a corporation of Pennsylvania No Drawing. Application June 13, 1933, Serial No. 675,648

1 Claim. (Cl. 99—10)

Our present invention relates to a dehydrated mix or flour for use in making pastry products and to a process of making the same, the present application being a continuation in part of our copending application, Serial No. 501,468, filed December 10, 1930, now Patent No. 1,931,892 of October 24, 1933.

In our aforesaid patent we have pointed out certain difficulties, defects and disadvantages in connection with the ordinary making of pastry products by the housewife. In addition to such we have found that there are also certain commercial difficulties which we have overcome by our present invention. For example, the dough formed in accordance with our aforesaid patent is inclined to be sticky or tacky and in such condition it is somewhat difficult to handle. Furthermore, the rolling, spreading or dividing machinery for putting the dough into proper condition for drying handles such sticky or tacky dough only with some difficulty and some loss of material.

We have found that the formation and treatment of a cold dough obviates the above defects and disadvantages in the commercial operations and such accordingly constitutes one of the objects of the present invention.

Another object of our invention contemplates the beating together of molasses and shortening in the cold at relatively high speed to obtain a homogeneous dispersion in the nature of an emulsion.

A further object of our invention is the production of a cold dough and the drying of the cold dough to produce a hard, dry, intermediate mass which can be readily pulverized and mixed with predetermined dry ingredients according to the ultimate desired nature of the mix.

A still further object resides in beating together molasses, shortening, sugar and salt in the cold at high speed until a homogeneous dispersion is obtained, after which flour is added and the mixture kneaded until a cold dough is formed; this dough is then dried under mild heat and vacuum to produce a hard, dry intermediate mass which is thereafter reduced to a suitable state of subdivision and the mix completed by commingling therewith predetermined dry ingredients according to the ultimate desired mix.

Other and further objects and advantages will be understood by those skilled in this art or will be apparent or pointed out hereinafter.

In preparing the mix of the present application we place molasses and shortening, preferably in the specified amounts, into the bowl of a high speed dough mixing machine which is provided with paddles rotating either horizontally or vertically. No heat is applied to the materials. The rapid beating is continued until a substantially homogeneous dispersion of the materials is obtained and this dispersion is in the nature of an emulsion. We then gradually add flour to the dispersion and knead the mixture by continued beating until a cold dough is formed which is of considerably decreased stickiness as compared with the hot dough formed in our aforesaid patent.

We next dry the dough. This may be done in a variety of ways. We may, for example, roll the dough into thin sheets which are dried by subjecting them to the influence of a blast of warm air, or we may divide the dough mechanically into small lumps which may be placed on trays or dried in a suitably heated drying cabinet; we may also force the dough through steel or other suitable dies to form thin strands, tubes or ribbons like spaghetti or macaroni and these strands, tubes or ribbons may be dried in any suitable apparatus. We have found that the cold dough lends itself to better and more ready handling by the rolling, dividing and drying machinery or apparatus and such is probably due at least in part to the decreased stickiness of the cold dough.

We prefer, however, to dry the dough by subjecting it to the action of mild heat and vacuum as in a vacuum shelf drier. The dough is filled into the trays or pans of the drier which are then placed on the shelves thereof and the oven closed. The dough is heated to 160 to 170° F. which we term a mild heat and at the same time is subjected to a vacuum of 28 to 29 inches. The mild heat is such that the glutinous or other characteristic properties of the dough will not be destroyed as otherwise the ultimate mix could not thereafter be properly cooked or baked. Such treatment, however, effectively removes enough moisture from the dough to produce a hard, dry, intermediate mass. Also air or gases entrapped mechanically within the dough are expelled by the heat and vacuum treatment and this is evidenced by the periodic rising and falling of the dough while in the vacuum oven as can be observed through the sight glass thereof.

When the dough has been converted to this hard, dry, intermediate product we find that the characteristics of the materials have been so changed that the individual constituents are unidentifiable as such and the materials in the mass as a result of the processing have been placed in a new physicochemical relationship, the exact nature of which we have been unable to determine and in such a condition as favoredly disposes it for the subsequent operations. Both chemical and microscopical analyses fail to show the individual ingredients which entered into the process. The hard, dry, intermediate mass is then reduced to a suitable state of subdivision as by grinding, pulverizing or the like and when this has been produced the mix is practically complete as all that is then required is to commingle or mix in the remaining ingredients which are all dry and in a suitable state of subdivision. These dry ingredients are of such a nature as will produce the ultimate desired product when milk or water has been added to the complete mix and the batter cooked or baked.

This will be understood when it is realized that we may make various pastry products from the mix depending upon the precise composition, particularly as to flavoring and seasoning ingredients.

The following composition represents a suitable complete mix for making gingerbread and contains the following ingredients in substantially the following proportions:

|  | Pounds | Percent |
| --- | --- | --- |
| Wheat flour | 100 | 43.0 |
| Molasses | 100 | 43.0 |
| Sugar | 11 | 4.8 |
| Shortening | 11 | 4.8 |
| Salt | ½ | 0.2 |
| Baking soda | 3 | 1.3 |
| Powdered whole egg | 6 | 2.6 |
| Powdered ginger | ½ | 0.2 |
| Powdered cinnamon | ¼ | 0.1 |

We are not limited, however, to the formation of gingerbread as we can make by this process mixes for use in making brown bread, spice cake, devil's food cake and the like by suitably varying the percentages of shortening or flour together with the omission of the undesired flavoring agents. In making a brown bread mix, for example, we would substitute a brown bread flour for a wheat flour and vary the percentage of shortening while at the same time omitting the unnecessary flavoring agents such as ginger and cinnamon.

In use, the mix is formed into a suitable batter by stirring or briefly beating it with water or milk and then baking or cooking the batter in the usual manner whereby an edible pastry product or the like is produced which is exceptionally good as to texture and flavor. The molasses is completely entrapped within the mix and volatiles do not escape during the processing so that we produce a gingerbread, for example, which is exceptionally full flavored in comparison to ordinary gingerbreads made with dried molasses.

It is to be understood that we are not restricted by the foregoing but intend the same more in an illustrative sense as the various ingredients can be varied within rather wide limits. Besides varying the percentages of the ingredients we may either add the sugar and salt to the molasses and shortening during the formation of the dispersion or we may omit the sugar and salt at that stage and add them later with the remaining dry ingredients. No essential difference is made in the ultimate mix. Other variations are also contemplated as, for example, in the shortening as to which we may use a hydrogenated edible vegetable oil or fat or a suitable animal fat such as lard. We may, however, use any desired shortening and such shortening may not be solid but can be semi-solid or liquid and since the higher grade shortenings are generally semi-solid or liquid rather than solid this enables us to make use of higher grade shortenings than have hitherto been able to be incorporated in a dry mix. At the same time our mix is free flowing and not sticky so that the particles do not agglomerate or lump together. This is an additional advantage. Furthermore, our mix is not harmfully hygroscopic despite the presence therein of more or less hygroscopic constituents and our mix is further characterized by excellent keeping qualities despite the presence in the mix of more or less non-keeping ingredients.

We may, furthermore, proceed by making a hot dough according to our aforesaid patent and then cool the same to produce a cold dough prior to further processing. The cooling may be carried out in any suitable manner as by cool air, water cooling or brief refrigeration. Either the hot dough formed may be cooled or the hot emulsion may be cooled before adding the flour to form a cold dough directly.

We may, in addition, add the molasses, shortening and flour at about the same time to the bowl and beat the same all together until the desired homogeneity is obtained.

What we claim as new and desire to secure by Letters Patent is:

A process of making a dehydrated mix of the character described, comprising making a homogeneous dough of shortening, molasses and flour in the cold, drying the dough to form a hard, dry intermediate mass, reducing the dried dough to a suitable state of subdivision and commingling therewith predetermined dry ingredients to complete the mix.

JOHN D. DUFF.
LOUIS E. DIETRICH.